US007172274B2

United States Patent
Hall et al.

(10) Patent No.: US 7,172,274 B2
(45) Date of Patent: Feb. 6, 2007

(54) PROCESS FOR PREPARING CHAIN EXTENDED THERMOPLASTIC GUANIDINIUM POLYMERS

(75) Inventors: Denise Hall, Manchester (GB); Stephen George Yeates, Manchester (GB); Tom Annable, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 195 days.

(21) Appl. No.: 10/502,011

(22) PCT Filed: Jan. 6, 2003

(86) PCT No.: PCT/GB03/00011

§ 371 (c)(1),
(2), (4) Date: Jul. 21, 2004

(87) PCT Pub. No.: WO03/066709

PCT Pub. Date: Aug. 14, 2003

(65) Prior Publication Data

US 2005/0041080 A1    Feb. 24, 2005

(30) Foreign Application Priority Data

Feb. 2, 2002   (GB) ................ 0202494.1

(51) Int. Cl.
*G01D 11/00*   (2006.01)
*B41J 2/17*   (2006.01)
(52) U.S. Cl. .................. 347/100; 347/96; 523/160

(58) Field of Classification Search ................ 347/100, 347/95, 96, 101; 523/160; 106/31.6, 31.13, 106/31.27
See application file for complete search history.

(56) References Cited

U.S. PATENT DOCUMENTS

| 4,159,898 A | 7/1979 | Cohen et al. |
| 4,559,058 A | 12/1985 | Bennett et al. |
| 4,666,519 A | 5/1987 | Akiyama et al. |
| 5,425,805 A | 6/1995 | Botros et al. |
| 5,849,311 A | 12/1998 | Sawan et al. ............... 424/406 |
| 5,942,218 A | 8/1999 | Kirschner et al. ....... 424/78.08 |
| 2001/0046824 A1 | 11/2001 | Nigam |

FOREIGN PATENT DOCUMENTS

| EP | 0566270 A1 | 10/1993 |
| EP | 0743345 A2 | 11/1996 |
| EP | 1172224 A1 | 1/2002 |
| WO | WO 00/37258 * | 6/2000 |
| WO | WO 02/08301 | 1/2002 |

* cited by examiner

*Primary Examiner*—Manish S. Shah
(74) *Attorney, Agent, or Firm*—Morgan Lewis & Bockius LLP

(57) ABSTRACT

A process for forming a chain extended thermoplastic polymer which includes reacting: (i) a prepolymer having one or more guanidinium or biguanidinium units and having at least one reactive end group; and (ii) a chain extender having at least two groups able to react with reactive end group(s) in (i). The polymer used as fixing agent to reduce highlighter smear of prints prepared by ink jet printing.

14 Claims, No Drawings

PROCESS FOR PREPARING CHAIN EXTENDED THERMOPLASTIC GUANIDINIUM POLYMERS

This invention relates to a process for the preparation of polymers, to polymers produced by this process, to an ink-jet printing method, to recording sheets, to compositions suitable for use in the preparation of recording sheets, to cartridges and to liquids and sets of liquids suitable for use in an ink-jet printer.

Ink jet printing (IJP) is a non-impact printing technique in which droplets of ink are ejected through a fine nozzle onto a substrate, e.g. paper, without bringing the nozzle into contact with the substrate. Compositions used in IJP should have good jettability (i.e. low tendency to block the fine nozzles used in ink-jet printers).

The images prepared by IJP desirably meet many demanding requirements. For example, they should be sharp and non-feathered and should also exhibit high water-fastness, light-fastness, humidity-fastness and optical density. Furthermore the recording sheets printed with the images are preferred to dry quickly so that sheets printed shortly afterwards do not smudge the image. The sheets preferably do not crack significantly, even when printed with pigment-based inks, and they should not markedly affect the shade or hue of the ink in such a way that an incorrectly coloured image results.

Increasingly nowadays highlighter pens are used to draw attention to particular parts of documents e.g. important sentences. The pen, usually containing a brightly coloured or fluorescent ink, is drawn by the reader over parts of the document they wish to highlight. A problem with many documents prepared by ink jet printing is that the highlighter can smear the text, making the important part of the document unsightly or even unreadable. Thus there is also a need to reduce the extent to which highlighters cause printed text to smear while at the same time ensuring the print is of good quality and has high permanence (i.e. fastness) against other sources of smear such as sweat.

U.S. Pat. No. 5,849,311 describes contact-killing non-leaching antimicrobial materials obtained from the reaction of polyhexamethylene biguanide and N,N-bis methylene diglycidyl aniline. The materials are highly crosslinked thermosetting polymers.

We have now devised certain thermoplastic polymers which may be used to fix ink jet prints and reduce the tendency of such prints to smear when highlighted.

According to the present invention there is provided a process for forming a chain extended thermoplastic polymer which comprises reacting:
(i) a prepolymer comprising one or more guanidinium or biguanidinium units and having at least one reactive end group; and
(ii) a chain extender having at least two groups able to react with the reactive end group(s) in (i).

The reaction is preferably performed at a temperature of 0 to 110° C., more preferably 10 to 105° C., especially 15 to 102° C.

The reaction time will vary, depending on such factors as the temperature, solvent, concentration of (i) and (ii), pH and reactivity of the chain extender towards the prepolymer. However reaction times of 5 min to 5 hours are typical.

The ratio of prepolymer (i) to chain extender (ii) may be defined by the molar ratio of nudeophilic groups on the prepolymer relative to reactive groups on the chain extender. Preferably this ratio is in the range 2:1 to 0.5:1, more preferably 1.5:1 to 0.5:1 and especially 0.95:1 to 0.6:1.

Preferably the reaction is performed in the presence of a solvent, especially water, a mixture of water and organic solvent or organic solvent free from water.

When the liquid medium comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent is a water-soluble organic solvent or a mixture of such solvents. Preferred water-soluble organic solvents include $C_{1-8}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide. When the solvent comprises organic solvent free from water, (i.e. less than 1% water by weight) the solvent preferably has a boiling point of from 30° to 200° C., more preferably of from 40° to 150° C., especially from 50 to 125° C.

It is especially preferred that the solvent is water. In the process of the present invention it is preferred that the prepolymer is dispersed, or more preferably dissolved in the solvent prior to reaction with the chain extender.

Preferably the prepolymer comprises a salt of a compound of Formula (1):

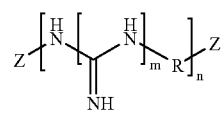

Formula (1)

wherein:
each R independently is a $C_{2-18}$-hydrocarbyl group;
m is 1 or 2;
n is 1 to 100; and
Z is a nucleophilic group.

When m is 1 the repeat unit in Formula (1) comprises a guanidinium group and when m is 2 the repeat unit in Formula (1) comprises a biguanidinium group.

During the synthesis of the chain extended thermoplastic polymer there is a risk of undesirable gel formation which lowers ink-jet printing performance. In order to avoid gel formation, it is desirable that the prepolymer has low levels of branching, preferably <20%, more preferably <15% and especially less than 10%. Further, in the first aspect of the present invention, the risk of undesirable gel formation can be reduced by the prepolymer (e.g. compounds of Formula (1), (2) and (3)) being in salt form because the guanidinium and biguanidium groups are significantly less reactive towards the chain extender than free guanidine and biguanide groups. Thus gelation is avoided by ensuring the guanidine or biguanide prepolymer is in salt form and any terminal amino groups are not in salt from (i.e. free —$NH_2$).

Preferably the hydrocarbyl groups represented by R are $C_{3-18}$-alkylene (more preferably $C_{4-16}$-alkylene, especially $C_{6-12}$-alkylene, more especially $C_6$-alkylene); $C_{3-12}$-arylene more preferably $C_{6-10}$-arylene, especially phenylene or naphthylene; $C_{7-12}$-arakylene (more preferably $C_{7-11}$-arylene, especially benzylene or xylyene); or a combination thereof.

When the hydrocarbyl group represented by R comprises an alkylene group it is preferably straight chain or branched chain.

The hydrocarbyl groups represented by R are optionally interrupted by one or more hetero atoms or groups and optionally carry one or more substituents other than hydrogen. Preferred interrupting atoms and groups are —O—, —S—, —NH—, —C(=O)— and phenylene. Preferred optional substituents are hydroxy; $C_{1-4}$-alkoxy; halo, especially chloro or bromo; nitro; amino; substituted amino; and acid groups, especially carboxy, sulpho and phosphato.

The prepolymer of Formula (1) may be either a single compound or a mixture of compounds with varying values of n. Typically manufacture of prepolymers of Formula (1) gives rise to a statistical mixture of compounds having a variety of values for n around an average value.

The prepolymer of Formula (1) may be a mixture of compounds where m is 1 with compounds where m is 2. However, preferably the prepolymer will predominantly comprise compounds of Formula (1) where m is either 1 or 2. It is especially preferred that the prepolymer predominantly comprises a compound of Formula (1) where m is 1.

In view of the foregoing preferences the prepolymer is preferably a salt of a compound of Formula (2):

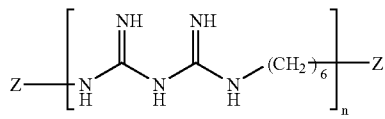

Formula (2)

wherein:
n is 1 to 100; and
Z is a nucleophilic group.

In another preferred embodiment the prepolymer is a salt of a compound of Formula (3):

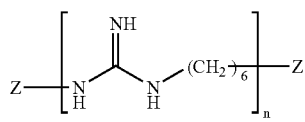

Formula (3)

wherein:
n is 1 to 100; and
Z is a nucleophilic group.

In Formulae (1), (2) and (3) n is preferably 2 to 40, more preferably 5 to 20.

From the above it will be understood that the term "prepolymer" does not imply that this species cannot be a polymer, rather it means that it is a precursor to the final chain extended thermoplastic polymer.

The prepolymer is preferably in the form of a water-soluble salt. Particularly preferred salts are hydrochloride, acetate, propionate, sulphate, phosphate, nitrate and mixtures thereof.

In Formulae (1), (2) and (3) Z is preferably a thiol, hydroxy or, more preferably, an amino group (including an amino group in salt form).

The chain extender preferably comprises a $C_{3-18}$-hydrocarbyl chain and two groups able to react with the reactive groups or groups in (i).

Preferred $C_{3-18}$-hydrocarbyl groups are as defined above for R. Of course the $C_{3-18}$-hydrocarbyl group in R may be the same as or different to the $C_{3-18}$-hydrocarbyl group in the chain extender. Thus, preferred groups able to react with the reactive group(s) in (i) are: isocyanate (for example the chain extender could be isophorone diisocyanate, toluene diisocyanate or hexylene diisocyanate); epoxide (for example the chain extender could be tetraethyleneglycol dieopxide, polyethyleneglycol diepoxide, polypropyleneglycol diepoxide or bisphenol A diepoxide); halide (for example the chain extender could be dibromohexane or xylylenedichloride); and (meth)acrylate (for example the chain extender could be dipropylene glycol diacrylate or triethylene glycol diacrylate).

Thus in a preferred embodiment the reactive end groups are amino groups and the at least two groups able to react with the reactive groups in (i) are selected from isocyanate and epoxide.

In view of the preferences stated above a particularly preferred embodiment of the first aspect of the invention is a process for forming a chain extended thermoplastic polymer which comprises reacting in the presence of a solvent:

(i) a prepolymer of Formula (1) in salt form:

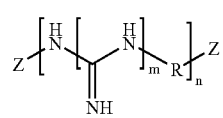

Formula (1)

wherein:
each R independently is a $C_{2-18}$-hydrocarbyl group;
m is 1 or 2;
n is 1 to 100; and
Z represents a nucleophilic group which comprise at least 50% amine groups; and (ii) a chain extender having at least two groups selected from isocyanate, epoxide, halide and (meth)acrylate able to react with Z.

According to a second aspect of the invention there is provided a chain extended thermoplastic polymer obtained or obtainable by a process according to the first aspect of the invention.

Preferably the chain extended thermoplastic polymer comprises less than 500 ppm halide, more preferably less than 500 ppm chloride ('ppm' means parts per million by weight relative to the total weight of the polymer).

As is well understood in the art (e.g. see Collins Concise Dictionary and Thesaurus) thermoplastic polymers become soft when heated and reharden on cooling without any appreciable change in properties. These can be contrasted with thermosetting polymers which harden permanently after one application of heat. The chain extended thermoplastic polymer preferably has a number average molecular weight (Mn) of greater than 1000 when measured by gel permeation chromatography. These Mn lead to a chain extended thermoplastic polymer with particularly good properties as a fixing agent for ink-jet printing. The measurement of Mn by gel permeation chromatography is well known to those skilled in the art and may, for example, be effected in conjunction with a standard polymer such as polystyrene or polymethylmethacrylate of known molecular weight.

According to a third aspect of the invention there is provided an ink-jet printing process comprising the steps (a) and (b) in any order or simultaneously:

(a) applying an ink to a substrate by means of an ink-jet printer in a localised manner to form an image on the substrate; and (b) applying to the substrate a fixing composition comprising a chain extended thermoplastic polymer according to the second aspect of the invention, a liquid medium and optionally a binder.

The ink used in step (a) of the process preferably comprises a liquid medium and a colorant. Preferred liquid media include water, a mixture of water and organic solvent and organic solvent free from water.

When the medium comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-soluble organic solvent or a mixture of such solvents. Preferred water-soluble organic solvents are as described in the first aspect of the invention.

When the liquid medium comprises organic solvent free from water, (i.e. less than 1% water by weight) the solvent preferably has a boiling point of from 30° to 200° C., more preferably of from 40° to 150° C., especially from 500 to 125° C. The organic solvent may be water-immiscible, water-soluble or a mixture of such solvents. Preferred water-soluble organic solvents are any of the hereinbefore-described water-soluble organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) and/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Liquid media comprising organic solvent free from water are particularly useful where fast drying times are required and particularly when printing onto hydrophobic and non-absorbent substrates, for example plastics, metal and glass.

Any colorant suitable for ink-jet printing may be used in the ink. Preferred colorants are pigments which may be organic (including carbon black) or inorganic, disperse dyes and water-soluble dyes, more preferably water-soluble azo dyes.

The colorant preferably has one or more groups for imparting or assisting water-solubility/dispersibility. Examples of such groups include —COOH, —$SO_3H$, —$PO_3H_2$, morpholinyl and piperazinyl and salts thereof.

When the colorant is a pigment the ink preferably also contains a suitable dispersant to give a stable dispersion of the pigment in the ink. Preferably the particle size of the pigment used in the ink is less than 1 μm.

The ink may contain a single colorant or comprise a mixture of two or more colorants. Examples of pigments which may be used in the ink used in the third aspect of the present invention include those described in U.S. Pat. No. 5,085,698, column 7, line 36 to column 8, line 48, and U.S. Pat. No. 5,846,307, column 3, lines 21 to 52, the disclosure of which Is incorporated herein by reference thereto. Furthermore, functionalised pigments such as those described in the patents belonging to Cabot Corporation may also be used.

Examples of dyes which may be used in the ink used in the process of the third aspect of the present invention are Pro-Jet™ dyes from Avecia and the dyes listed in U.S. Pat. No. 4,725,849, column 4, line 13 to column 6, line 13, the disclosure of which incorporated herein by reference thereto.

The colorant is preferably present in the ink at a concentration of 0.5 to 20 parts, more preferably from 1 to 15 parts and especially from 1 to 5 parts by weight based upon the weight of the ink.

The ink may also contain additional components conventionally used in ink-jet printing inks, for example viscosity and surface tension modifiers, corrosion inhibitors, additives to prevent paper curl, biocides, kogation reducing additives, dispersants and surfactants which may be ionic or non-ionic.

In step (b) the fixing composition is preferably applied to the substrate using a general coating method such as dip coating, reverse roller coating, K-bar coating or spraying wherein the coating is usually applied to all or most of at least one side of the substrate or by an ink-jet printer when the fixing composition is applied to selected areas of the substrate. When an ink-jet printer is used the fixing composition is preferably stable to storage over time without decomposing or forming a precipitate that could block the fine nozzles of the ink-jet printer.

The chain extended thermoplastic polymer and, optionally, a binder are preferably dispersed or more preferably dissolved in the liquid medium. The liquid medium is preferably selected from water; organic solvent; and a mixture of water and one or more water-soluble organic solvent(s). Preferred solvents and solvent systems are selected from the list above in relation to liquid media for inks.

The fixing composition used in step (b) preferably contains a binder. The binder is preferably a polymeric or polymerisable binder, more preferably a water-soluble or water-dissipatable or polymerisable polymeric binder or a hydrophobic binder. Preferred water-soluble polymeric and polymerisable binders include starches, preferably hydroxy alkyl starches, for example hydroxyethylstarch; celluloses, for example cellulose, methylcellulose, hydroxyethylcellulose, hydroxypropylcellulose, hydroxyethyl methyl cellulose, carboxymethlycellulose (and salts thereof) and cellulose acetate; butyrate; gelatin; gums, for example guar, xanthan gum and gum arabic; polyvinylalcohol; polyvinylphosphate; polyvinylpyrrolidone; polyvinylpyrrolidine; polyethylene glycol; hydrolysed polyvinylacetate; polyethylene imine; polyacrylamides, for example polyacrylamide and poly(N,N-dimethyl acrylamide) and polyacrylamido-2-methyl propane sulphonic acid); acrylamide-acrylic acid copolymers; polyvinylpyridine; polyvinylphosphate; vinylpyrrolidone-vinyl acetate copolymers; vinyl pyrrolidone-styrene copolymers; polyvinylamine; poly(vinyl pyrrolidonedialkylaminoalkyl alkylacrylates), for example poly vinylpyrrolidone-diethylaminomethylmethacrylate; acid-functional acrylic polymers and copolymers, for example poly(meth)acrylic acid and copolymers of (meth)acrylic acid and other (meth)acrylate monomers; amine-functional acrylic polymers and copolymers, for example polydimethylaminoethylmethacrylate; acid or amine functional urethane polymers, preferably those containing dimethylolpropanoic acid and/or pendant or terminal polyethylene glycols; ionic polymers, especially cationic polymers, for example poly (N,N-dimethyl-3,5-dimethylene piperidinium chloride); polyesters, preferably those which carry water-solubilising groups, especially sulphonic acid groups, for example polyesters obtainable by polymerising a polyol with sodiosulphoisophthalic acid.

The water-soluble binders are preferred over water-dissipatable binders due to their fast dry times and lower tendency to block the fine jets used in ink-jet printers. A combination of water-soluble binders and water-dissipatable binders can also be beneficial in terms of improved mechanical strength, reduced tendency for sheets to stick together and good ink absorbency.

Preferred water-dissipatable binders are water dissipatable-polymeric binders, more preferably latex polymers, for example cationic, non-ionic and anionic styrene-butadiene latexes; vinyl acetate-acrylic copolymer latexes; acrylic copolymer latexes which carry quaternary ammonium groups, for example containing copolymerised dimethylaminoethyl (meth)acrylate; and dispersions of polyester, polyurethane, (meth)acrylate or vinyl polymers and copolymers thereof. The polymer dispersions are preferably prepared by emulsion polymerisation or by dispersion into water of polymers prepared by suspension, bulk or solution polymerisation.

The binder may comprise a single binder or a mixture of two or more binders, especially the preferred binders mentioned above.

Overall particularly good results are found when the binder comprises methylcellulose (to give good mechanical properties), polyvinylpyrrolidone, polyvinylalcohol, or a combination thereof to give the combined benefits mentioned above.

When a binder is included in a fixing composition of step (b) to be applied by a general coating method the weight ratio of the binder to the polymer is preferably from 99:1 to 1:99, more preferably from 60:40 to 15:85, especially from 50:50 to 20:80 and more especially from 30:70 to 20:80.

When a binder is included in a fixing composition of step (b) which is to be applied using an ink-jet printer the weight ratio of the binder to the polymer is preferably from 0.1 to 20, more preferably from 0.5 to 10 and especially from 1 to 5. Preferably when a fixing composition of step (b) is applied using an ink-jet printer the fixing composition is free from binder.

A fixing composition when applied by a coating method other than ink jet may also contain a cross-linker, preferably in an amount which causes from 0.1 to 5%, more preferably 0.15 to 4%, especially 0.2 to 2% crosslinking of the crosslinkable components of the fixing composition. These levels of crosslinking are preferred because they can result in enhanced mechanical strength without adversely affecting ink-absorbing properties.

Suitable crosslinkers include salts of divalent and trivalent metals (e.g. calcium and magnesium acetate). These metals sometimes offer the advantage of further improving water-fastness of resultant prints.

The fixing composition of step (b) when applied by a general coating method may also contain further ingredients if desired, for example catalysts (e.g. to accelerate cross-linking of the binder), polymeric fillers (e.g. polymethylmethacrylate particles of 10 to 50 μm diameter), anti-kogation additives, cross-linkers, primers, drying-time accelerators, adhesion promoters, defoamers, surfactants, cationic or anionic salts (e.g. an inorganic acid or organic acid salt of an optionally substituted polyethyleneimine), whiteners and/or inorganic minerals (e.g. to entrap ink, such as silicates and aluminates) and combinations thereof, to name but a few.

When the fixing composition is applied by a coating method other than ink jet to the substrate prior to the ink it is preferred that the fixing composition is dried and/or polymerised (e.g. cross-linked) before the ink is applied. Any suitable drying method may be used, for example hot air drying. Therefore a preferred embodiment of the process comprises step (b), followed by drying and/or polymersation of the product of step (b), followed by step (a).

The fixing composition of step (b) is preferably applied such that the concentration of chain extended thermoplastic polymer on the substrate, when dry, is up to 20 $g.m^{-2}$, more preferably up to 5 $g.m^{-2}$, especially from 0.1 to 2 $g.m^{-2}$, and more especially from 0.5 to 1 $g.m^{-2}$.

Preferably step (b) of the process is performed before step (a) or simultaneously with step (a).

When the fixing composition of step (b) is applied to the substrate by means of an ink-jet printer, the ink-jet printer is preferably the same as that used to apply the ink to the substrate in step (a). In this embodiment the fixing composition of step (b) is preferably applied to the substrate shortly prior to, or simultaneously with, application of the ink in step (a). Preferably the ink-jet printer used to apply the ink and fixing composition of step (b) has a nozzle or a series of nozzles in the printer that are dedicated to the application of the fixing composition of step (b). Thus the printer may be of the 'five or more pen' type in which yellow, magenta, cyan and black are applied by four pens and the fixing composition is applied by a fifth pen. A suitable ink-jet printer and a method for its control is described in EP 657 849.

By applying the fixing composition of step (b) by means of an ink-jet printer one may use ordinary media (e.g. plain paper) as the substrate, avoiding the need for expensive special substrates. Furthermore, application of the fixing composition by means of the ink-jet printer can avoid wasting chain extended thermoplastic polymer because the polymer can be selectively applied to the localised areas referred to in step (a). A still further advantage arising from the ability to selectively apply the chain extended thermoplastic polymer in a localised manner is that undesirable stains such as dirt, tea, coffee are not attracted to or fixed onto unprinted areas.

In step (b) therefore it is preferred that the fixing composition is applied to the substrate in a localised manner and the areas where the ink and fixing composition are applied in steps (a) and (b) are substantially coextensive. For example, the areas printed with the ink and the areas printed with the fixing composition overlap by at least 80%, more preferably at least 90%, especially at least 95%, more especially at least 98%.

It is to be understood that in all embodiments of the present invention the terms "ink", "colorant", "prepolymer", "chain extender", "chain extended thermoplastic polymer" and "binder" extend to two or more of these materials as well as one of them.

Preferably the fixing composition to be applied to a substrate by means of an ink-jet printer in step (b) is a composition comprising:

(a) from 0.1 to 10 parts of a chain extended thermoplastic polymer according to the second aspect of the present invention;
(b) from 0 to 10 parts of binder;
(c) from 30 to 60 parts of water-soluble organic solvent; and
(d) from 35 to 80 parts water;

wherein all parts are by weight and the total number of parts (a)+(b)+(c)+(d)=100.

This fixing composition forms a fourth feature of the present invention.

Preferred water-soluble organic solvents are selected from the list above in relation to liquid media for inks and preferred binders are as described above. Of course the fixing composition may contain further ingredients in addition to (a) to (d), e.g. surface tension modifiers, viscosity modifiers, biocides etc.

In one embodiment the fixing composition preferably has a viscosity of less than 20 cP, more preferably less than 5 cP at 25° C. Such fixing compositions are particularly well suited for application to substrates by means of an ink-jet printer Preferably the fixing composition is transparent or colourless when dry.

Preferably the fixing composition contains less than 500 ppm, more preferably less than 250 ppm, especially less than 100 pm, more especially less than 10 ppm in total of divalent and trivalent metal ions (other than any divalent and trivalent metal ions bound to a component of the ink).

Preferably the fixing composition comprises less than 500 ppm halide by weight, more preferably less than 500 ppm chloride ('ppm' means parts per million by weight relative to the total weight of the fixing composition).

Preferably the fixing composition has been filtered through a filter having a mean pore size below 10 µm, more preferably below 3 µm, especially below 2 µm, more especially below 1 µm. This filtration removes particulate matter that could otherwise block the fine nozzles found in many ink-jet printers.

Thus a particularly preferred fixing composition is one which comprises a chain extended thermoplastic polymer and contains less than 500 ppm divalent and trivalent metal ions (other than any divalent and trivalent metal ions bound to a component of the ink) and which has been filtered through a filter having a mean pore size below 10 µm.

The ink-jet printer preferably applies the ink (and optionally the fixing composition comprising the chain extended thermoplastic polymer) to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice. Alternatively ink jet printers of the "paddle" type described in International Patent Applications WO 00/48938 and WO 00/55089 may be used.

The substrate is preferably paper, plastic, a textile, metal or glass, more preferably paper, a textile or a plastic film (especially a transparent film, for example an overhead projector slide). It is especially preferred that the substrate is paper (particularly coated paper, more particularly a lightweight coated offset type paper), a textile or a transparent film.

Preferred plastic films are transparent polymeric films, especially those suitable for use as overhead projector slides, for example polyesters (especially polyethylene terephthalate), polycarbonates, polyimides, polystyrenes, polyether sulphones, cellulose diacetate and cellulose triacetate films.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

The prints obtained using the process exhibit low colour bleed, high print quality, superior fastness to highlighter pens and, in some cases, higher light-fastness compared to prints prepared without the chain extended thermoplastic polymer. Furthermore, the application of the chain extended thermoplastic polymer does not markedly affect the shade or hue of the ink and does not result in the discoloration of the printed substrate.

According to a fifth aspect of the present invention there is provided a substrate printed with an image by means of the process according to the third aspect of the invention. The preferred substrates are as hereinbefore defined in relation to the third aspect of the present invention.

According to a sixth aspect of the present invention there is provided a recording sheet comprising a substrate, a chain extended thermoplastic polymer according to the second aspect of the present invention and optionally a binder.

Preferred chain extended thermoplastic polymers and binders are as hereinbefore described.

Preferably the recording sheet is white or transparent.

When the recording sheet bears the chain extended thermoplastic polymer as part of a multi-layer layer coating the chain extended thermoplastic polymer may be at any position of the multi-layer coating, for example it may optionally be the inner-most layer in direct contact with the substrate, the outer-most layer, a layer between the inner-most and outer-most layers, chain extended thermoplastic polymer layers may be present at two or more of such positions. Preferably the recording sheet bears a thin (preferably 0.1 to 9.9 µm thickness) outer chain extended thermoplastic polymer layer and a thick (preferably 10 to 50 µm thickness) inner layer which does not contain a chain extended thermoplastic polymer. In this way rapid dry times and good dye fixation may be achieved as well as reducing the likelihood of the layer 'cracking' compared to when the combination of thick and thin layers is not used. The thick inner layer may be prepared from binders exactly as described above for the Guanidine Layer except that the chain extended thermoplastic polymer is omitted.

The recording sheet preferably has a thickness of from 10 to 1000 µm, more preferably from 50 to 500 µm. The substrate preferably has a thickness of from 9 to 990 µm, more preferably from 49 to 499 µm. The coating, whether single- or multi-layered, preferably has an overall thickness of from 0.1 to 50 µm, more preferably from 5 to 30 µm, especially from 10 to 20 µm.

The composition is preferably applied to the substrate by the methods described above in relation to the third aspect of the invention.

The recording sheets may be used as ink receptive sheets in a wide range of printing processes, especially ink-jet printing. They are able to provide excellent quality images, often of near photographic quality, having good wet-fastness, light-fastness, gloss and low sticking and cracking properties. The resultant prints usually have good optical density, even with black pigment inks which often suffer from a drop in optical density, an unsightly grey appearance and poor image quality when printed onto conventional recording sheets. The humidity fastness is also good. Furthermore the sheets benefit from good storage stability and a low susceptibility to bacterial decay.

According to a seventh aspect of the present invention there is provided a set of liquids suitable for use in an inkjet printer comprising:
(a) a fixing composition comprising:
   (i) 0.01 to 50 parts, more preferably 0.1 to 30 and especially from 0.1 to 10 parts of a chain extended thermoplastic polymer according to the second aspect of the present invention;
   (ii) 50 to 99.8, more preferably 60 to 80 parts of a liquid medium selected from water, one or more water-soluble organic solvents and a mixture of water and one or more water-soluble organic solvents; and
   (iii) 0 to 50, preferably 0 to 40, more preferably from 0 to 10 parts of a binder;
wherein all parts are by weight and the total number of parts (i)+(ii)+(iii)=100; and
(b) an ink comprising a colorant and a liquid medium.

The preferred chain extended thermoplastic polymers, inks, colorants, liquid media and binders are as hereinbefore defined in the third aspect of the present invention.

The set according to the seventh aspect of the present invention is preferably housed in an ink-jet printer, i.e. the invention also provides an ink-jet printer comprising a printing mechanism and a set of liquids wherein the set of liquids is as defined in the seventh aspect of the present invention. The set of liquids may be contained in one or more than one cartridge present in an ink-jet printer.

The invention also provides an ink-jet printer cartridge comprising a plurality of chambers and a set of liquids, wherein the liquids are contained in individual chambers of the ink-jet printer cartridge and the set of liquids is as defined in the seventh aspect of the invention.

The invention also provides an ink-jet printer cartridge comprising a plurality of chambers and a composition, wherein the composition is contained in the chamber of the ink-jet printer cartridge and the composition is as defined in the fourth aspect of the invention.

Although devised and optimised for use as a fixing agent the prepolymers according to the second aspect of the invention may also be of use as antimicrobial agents with particular utility in those applications where rapid kill is required, for example as a swimming pool sanitiser, disinfectant, preservative for contact lens solutions, or as a personal care preservative.

The headings in this patent specification are solely to assist navigation of the description and do not in any way limit the scope of the invention or applicability of text under one heading to that specific aspect of the invention.

The invention is further illustrated by the following examples in which all parts and percentages are by weight unless specified otherwise.

EXAMPLE 1

Preparation of Chain Extended Thermoplastic Polymer "CE Polymer 1" Stage 1 -Preparation of Prepolymer 1 Solution A mixture of guanidine hydrochloride (200 parts) and hexamethylene diamine (292 parts) were heated to 120° C. for 4 hours under a nitrogen atmosphere The temperature was then raised to 150–170° C. for a further 5 hours. The mixture was cooled to 80° C. and water (400 parts) was added, maintaining the temperature at 80° C. until dissolution occurred. The mixture was then cooled to give a solution in water of polyhexamethyleneguanidine, referred to as Prepolymer 1, having a weight average molecular weight (Mw) of 1010 and a number average molecular weight (Mn) of 710, as determined by aqueous gel permeation chromatography.

The percentage of amine (as $NH_2$) in Prepolymer 1 as determined by titration with hydrochloric acid (1M), was found to be 4.7% by total weight $^{13}C$ NMR indicated the percentage of end groups in Prepolymer 1 which were amine groups was 71.5% by weight. $^{13}C$ NMR also indicated the percentage branching through triple substitution of the in-chain guanidine groups with was 12%.

Stage 2

Reaction of Prepolymer 1 with a Chain Extender

Prepolymer 1 solution from Stage 1 (51.2 g) was mixed with water (78.83 g) and tetraethyleneglycol diepoxide (9.8 g, a chain extender called Denacol™ EX821, from Nagase). The two components were reacted under a nitrogen atmosphere at 25° C. for 2 hours.

The resultant chain extended thermoplastic polymer, CE Polymer 1, had an Mw of 3190 and an Mn of 1520.

EXAMPLES 2 TO 12

Prepolymer 1 was prepared as described in Example 1 above.

Preparation of Prepolymer 2

Guanidine hydrochloride (200 parts) and hexamethylene diamine (268 parts) were heated to 120° C. for 4 hours under a nitrogen atmosphere. The temperature of the reaction mixture was then raised to 150–170° C. for a further 10 hours. The mixture was cooled to 80° C. and water (400 parts) was added while the temperature was maintained at 80° C. until dissolution occurred. The mixture was then cooled to give a solution of polyhexamethyleneguanidine (Prepolymer 2) in water.

Prepolymer 2 had an Mw, of 1120 and an Mn, of 740, as determined by aqueous gel permeation chromatography. The percentage of amine (as $NH_2$) in Prepolymer 2 was determined by titration with hydrochloric acid (1M) to be 3.5% by total weight.

The preparation and properties of chain extended thermoplastic polymers CE 2 to 11 are shown in Table 1 below. The method of Example 1 was repeated except that in place of 9.8 g of tetraethyleneglycol diepoxide there was used the chain extender in the amount shown in Table 1, column 2 below. The molar ratio of epoxide:amine in the reaction mixture is shown in column 3. the third, fourth and fifth columns of Table 1 show the name of the resultant chain extended thermoplastic polymer and its Mw and Mn respectively. TEGD is tetraethyleneglycol diepoxide and TPGD is tetrapropyleneglycol diepoxide.

TABLE 1

| Example | Prepolymer (weight in g) | Chain Extender (weight in g) | Molar Ratio epoxide:amine | Resultant CE Polymer | Mw | Mn |
|---|---|---|---|---|---|---|
| 2 | Prepolymer 1 (29.9 g) | TEGD (13.1) | 0.8 | CE Polymer 2 | 9420 | 1970 |
| 3 | Prepolymer 1 (29.9 g) | TEGD (15.1) | 0.95 | CE Polymer 3 | 26440 | 2330 |
| 4 | Prepolymer 1 (29.9 g) | TPGD (9.4) | 0.6 | CE Polymer 4 | 2160 | 1250 |
| 5 | Prepolymer 1 (29.9 g) | TPGD (12.5) | 0.8 | CE Polymer 5 | 2810 | 1400 |
| 6 | Prepolymer 1 (29.9 g) | TPGD (14.8) | 0.95 | CE Polymer 6 | 3430 | 1500 |
| 7 | Prepolymer 2 (29.9 g) | TEGD (7.33) | 0.6 | CE Polymer 7 | 2470 | 1060 |
| 8 | Prepolymer 2 (29.9 g) | TEGD (9.78) | 0.8 | CE Polymer 8 | 4140 | 1270 |
| 9 | Prepolymer 2 (29.9 g) | TEGD (11.6) | 0.95 | CE Polymer 9 | 6440 | 1440 |
| 10 | Prepolymer 2 (29.9 g) | TPGD (6.98) | 0.6 | CE Polymer 10 | 1810 | 930 |
| 11 | Prepolymer 2 (29.9 g) | TPGD (9.31) | 0.8 | CE Polymer 11 | 2300 | 1020 |
| 12 | Prepolymer 2 (29.9 g) | TPGD (11.1) | 0.95 | CE Polymer 12 | 2710 | 1080 |

EXAMPLES 13 TO 15

Preparation of Prepolymer 3 Solution

Guanidine hydrochloride (200 parts) and hexamethylene diamine (292 parts) were heated to 120° C. for 4 hours under a nitrogen atmosphere. The temperature of the reaction mixture was then raised to 150–170° C. for a further 10 hours. The product was cooled to 80° C. and 1,5-pentanediol (400 parts) was added while the temperature was maintained at 80° C. until dissolution occurred. The mixture was then cooled to give a solution of polyhexamethyleneguanidine (prepolymer 3) in 1,5-pentanediol.

Prepolymer 3 had an Mw of 1830 and an Mn of 1030, as determined by gel on chromatography. The percentage of amine (as $NH_2$) determined by titration with hydrochloric acid (1M) was found to be 4.0% by total weight.

Reaction of Prepolymer 3 with Chain Extender

Prepolymer 3 solution (73.17 g) was mixed with 1,5 pentane diol (26.83 g) and isophorone diisocyanate (IPDI, from Aldrich), under a nitrogen atmosphere at 25° C. The loss of isocyanate groups was monitored by infrared spectroscopy, and the reaction continued until complete loss had occurred. The weight of isophorone diisocyanate and the consequent molar ratio of isocyanate to amine from Prepolymer 3 is shown in the Table 2 along with the molecular weight of the resultant chain extended thermoplastic polymer formed, as determined by aqueous gel permeation chromatography.

The preparation and properties of chain extended thermoplastic polymers CE 13 to 15 are shown in Table 2 below. The method of Example 1 was repeated except that in place of 9.8 g of tetraethyleneglycol diepoxide there was used the chain extender in the amount shown in Table 2, column 3 below. The molar ratio of isocyanate:amine in the reaction mixture is shown in column 4. The 5$^{th}$, 6$^{th}$ and 7$^{th}$ columns of Table 2 show the name of the resultant chain extended thermoplastic polymer and its Mw and Mn respectively.

TABLE 2

| Example | Prepolymer (weight in g) | Chain Extender (weight in g) | Molar Ratio isocyanate:amine | Resultant CE Polymer | Mw | Mn |
|---|---|---|---|---|---|---|
| 13 | Prepolymer 3 (29.9 g) | IPDI (5.06 g) | 0.6 | CE Polymer 13 | 82490 | 1690 |
| 14 | Prepolymer 3 (29.9 g) | IPDI (6.75 g) | 0.8 | CE Polymer 14 | 96120 | 1770 |
| 15 | Prepolymer 3 (29.9 g) | IPDI (8.02 g) | 0.95 | CE Polymer 15 | 310930 | 1880 |

EXAMPLES 14 TO 28

Preparation of Fixing Compositions 1 to 15

Fixing Compositions were prepared by dissolving the fixing agent shown Table 3, column 2 (5 parts) in a mixture of 2-pyrrolidinone (9 parts), thiodiethylene glycol (9 parts), cyclohexanol (2 parts) and deionised water (75 parts). The pH was adjusted to 4.0 using nitric acid or sodium hydroxide (1M) as required.

In the control examples PEI is polyethyleneimine of Mw 800, supplied by BASF (Lupasol™ FG) and PHMG is Prepolymer 2.

TABLE 3

Preparation of Fixing Compositions

| Example | Fixing Agent used (weight in g) | Resultant Fixing Composition |
|---|---|---|
| Example 14 | CE Polymer 1 | 1 |
| Example 15 | CE Polymer 2 | 2 |
| Example 16 | CE Polymer 3 | 3 |
| Example 17 | CE Polymer 4 | 4 |
| Example 18 | CE Polymer 5 | 5 |
| Example 19 | CE Polymer 6 | 6 |
| Example 20 | CE Polymer 7 | 7 |
| Example 21 | CE Polymer 8 | 8 |
| Example 22 | CE Polymer 9 | 9 |
| Example 23 | CE Polymer 10 | 10 |
| Example 24 | CE Polymer 11 | 11 |
| Example 25 | CE Polymer 12 | 12 |
| Example 26 | CE Polymer 13 | 13 |
| Example 27 | CE Polymer 14 | 14 |
| Example 28 | CE Polymer 15 | 15 |
| Comparative Ex 1 | PEI* | PEI* |
| Comparative Ex 2 | PMG* | PMG* |
| Comparative Ex 3 | Water* | Water* |

*= Comparative Example only - no chain extended thermoplastic polymer present

EXAMPLE 29

Ink Jet Printing

Stage 1—Preparation of an Ink

An ink was prepared by mixing the ingredients shown in Table 3 and adjusting the pH to 8.0 using sodium hydroxide (1M). ProJet Fast Magenta 2™ was obtained from Avecia Limited.

TABLE 4

Ink Preparation

| Ingredient | % by weight |
|---|---|
| ProJet Fast Magenta 2 ™ | 3 |
| 2-pyrrolidinone | 9 |
| thiodiethylene glycol | 9 |
| cyclohexanol | 2 |
| Deionised water | 77 |

Ink-Jet Printing

The fixing compositions were evaluated by poured into the cyan compartment of an empty Olivetti JP192™ colour ink cartridge and the ink was poured into the empty yellow chamber. The fixing compositions were printed using an Olivetti JP192™ standard 3 colour thermal ink-jet printer onto Spectratech Lustrolaser™ paper, followed by ink. Therefore the fixing The resultant prints were evaluated as described below.

Wet-Fastness Assessment

The paper printed with the inks in a pattern of parallel bars was attached to a support at a 45° angle such that the parallel bars were in a horizontal direction. A pipette was then used to dispense 0.5 ml of distilled water (pH 6 to 7) onto the print at a position slightly above the top of the parallel bars, taking care to ensure the run down of water over the print was as close as possible to a right angle to the printed bars.

After allowing the print to dry the average reflected optical density of the stained area between printed bars 4 to 6 ("OD Stained") and the average reflected optical density of the unprinted, unstained areas ("Background OD") were measured using an X rite Spectrodensitometer. The extent to which the water caused the prints to run into the unprinted area (i.e. the "Run Down") was calculated by the equation:

Run Down=(OD Stained−Background OD)

Highlighter Smear

Paper was printed as described above for the wet-fastness assessment. Highlighter smear tests were performed 24 hours after printing using a Stabilo Boss™ yellow highlighter "Stabilo highlighter", and a Sanford Major Accent™ yellow highlighter "Sanford highlighter". The tests were performed by drawing the highlighter twice over unprinted areas of the paper and then twice over a printed bar and the adjacent unprinted area. The average reflected optical density was measured for unprinted areas of the paper where the highlighter pen had been drawn over twice ("Background OD"). Additionally the average reflected optical density was measured for areas of the paper adjacent to printed areas where the highlighter had been drawn over twice ("OD Smeared"). The extent to which the highlighter pen caused the prints to smear into the unprinted area of the paper (i.e. the "Highlighter Smear") was calculated by the equation:

Highlighter Smear=(OD Smeared−Background OD).

The Run Down and Highlighter Smear results are shown in Table 5 wherein lower values indicate lower Run Down (i.e. better wet-fastness) and lower Highlighter Smear.

In Table 5 fixing compositions contained the chain extended thermoplastic polymer of the same number, e.g. Fixing Composition 11 contained CE polymer 11.

TABLE 5

| Fixing Composition | Optical Density of the print | Run Down | Stabilo Highlighter Smear | Sanford Highlighter Smear |
|---|---|---|---|---|
| 1 | 0.931 | 0.015 | 0.015 | 0.121 |
| 2 | 0.958 | 0.015 | 0.012 | 0.093 |
| 3 | 0.902 | 0.013 | 0.003 | 0.101 |
| 4 | 0.857 | 0.006 | 0.007 | 0.053 |
| 5 | 0.950 | 0.023 | 0.010 | 0.115 |
| 6 | 0.970 | 0.017 | 0.008 | 0.081 |
| 7 | 0.863 | 0.013 | 0.014 | 0.077 |
| 8 | 0.935 | 0.013 | 0.001 | 0.091 |
| 9 | 0.882 | 0.002 | 0.017 | 0.079 |
| 10 | 0.994 | 0.018 | 0.011 | 0.098 |
| 11 | 0.930 | 0.010 | 0.022 | 0.112 |
| 12 | 0.905 | 0.007 | 0.010 | 0.116 |
| 13 | 0.784 | 0.050 | 0.019 | 0.112 |
| 14 | 0.865 | 0.025 | 0.013 | 0.100 |
| 15 | 0.904 | 0.088 | 0.026 | 0.112 |
| PEI* | 0.793 | 0.006 | 0.027 | 0.212 |
| PMG* | 0.934 | 0.006 | 0.027 | 0.118 |
| Water* | 1.041 | 0.126 | 0.036 | 0.113 |

*= Comparative examples

A comparison of results of Table 5 shows that fixing compositions 1 to 15 demonstrated superior resistance to smearing by highlighter pens than a prepolymer which had not been chain extended (i.e. PHMG), an alternative fixing agent (PEI) and versus use of no fixing agent at all (water).

The invention claimed is:

1. A process for forming a chain extended thermoplastic polymer which comprises reacting:

(i) a prepolymer comprising a salt of a compound of Formula (1):

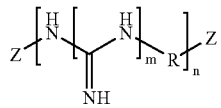

Formula (1)

wherein:
each R independently is a $C_6$-alkylene group;
m is 1 or 2;
n is 1 to 100;
Z is a nucleophilic group; and (ii) a chain extender having at least two groups able to react with the nucleophilic groups in (i).

2. A process according to claim 1 which is performed at a temperature of 0 to 110° C.

3. A process according to claim 1 wherein the nucleophilic group is thiol, hydroxy or an amino group.

4. A process according to claim 1 wherein the at least two groups able to react with the nucleophilic groups in (i) are selected from isocyanate, epoxide, halide and (meth)acrylate.

5. A process according to claim 1 wherein the nucleophilic end groups are amino groups, including an amino group in salt form, and the at least two groups able to react with the reactive groups in (i) are selected from isocyanate and epoxide.

6. A chain extended thermoplastic polymer obtained by a process according to claim 1.

7. A composition comprising:
(a) from 0.1 to 10 parts of a chain extended thermoplastic polymer according to claim 6;
(b) from 0 to 10 parts of binder;
(c) from 30 to 60 parts of water-soluble organic solvent; and
(d) from 35 to 80 parts water;
wherein all parts are by weight and the total number of parts (a)+(b)+(c)+(d)=100.

8. An ink-jet printing process comprising the steps (a) and (b) in any order or simultaneously:
(a) applying an ink to a substrate by means of an ink-jet printer in a localised manner to form an image on the substrate; and
(b) applying to the substrate a fixing composition comprising a chain extended thermoplastic polymer according to claim 6, a liquid medium and optionally a binder.

9. A substrate printed with an image by means of the process according to claim 8.

10. A recording sheet comprising a substrate, a chain extended thermoplastic polymer according to claim 6 and optionally a binder.

11. A set of liquids suitable for use in an ink-jet printer comprising:
(a) a fixing composition comprising:
(i) 0.01 to 50 parts, more preferably 0.1 to 30 and especially from 0.1 to 10 parts of a chain extended thermoplastic polymer according to claim 6;
(ii) 50 to 99.8, more preferably 60 to 80 parts of a liquid medium selected from water, one or more water-soluble organic solvents and a mixture of water and one or more water-soluble organic solvents; and
(iii) 0 to 50, preferably 0 to 40, more preferably from 0 to 10 parts of a binder;
wherein all parts are by weight and the total number of parts (i)+(ii)+(iii)=100; and
(b) an ink comprising a colorant and a liquid medium.

12. An ink-jet printer cartridge comprising a plurality of chambers and a set of liquids, wherein the liquids are contained in individual chambers of the ink-jet printer cartridge and the set of liquids is as defined in claim 11.

13. An ink-jet printer cartridge comprising a plurality of chambers and a composition according to claim 7, wherein the composition is contained in the chamber of the ink-jet printer cartridge.

14. The process of claim 1 wherein the pre-polymer has less than 10% branching.

* * * * *